United States Patent
Filshill et al.

(10) Patent No.: US 11,123,776 B2
(45) Date of Patent: Sep. 21, 2021

(54) METHODS AND SYSTEMS FOR LANDFILL THERMAL INSULATION

(71) Applicant: Aero Aggregates of North America LLC, Eddystone, PA (US)

(72) Inventors: Archibald Stewart Filshill, Huntingdon Valley, PA (US); Thomas Liam McGrath, Eddystone, PA (US)

(73) Assignee: Aero Aggregates of North America LLC, Eddystone, PA (US)

(*) Notice: Subject to any disclaimer, the term of this patent is extended or adjusted under 35 U.S.C. 154(b) by 0 days.

(21) Appl. No.: 16/754,631

(22) PCT Filed: Oct. 9, 2018

(86) PCT No.: PCT/US2018/054969
§ 371 (c)(1),
(2) Date: Apr. 8, 2020

(87) PCT Pub. No.: WO2019/074902
PCT Pub. Date: Apr. 18, 2019

(65) Prior Publication Data
US 2020/0261951 A1    Aug. 20, 2020

Related U.S. Application Data

(60) Provisional application No. 62/569,739, filed on Oct. 9, 2017.

(51) Int. Cl.
*B09B 1/00* (2006.01)
*C03C 11/00* (2006.01)
(Continued)

(52) U.S. Cl.
CPC ............ *B09B 1/004* (2013.01); *C03C 11/007* (2013.01); *B09B 1/006* (2013.01); *C03C 1/002* (2013.01); *E02D 31/00* (2013.01); *E02D 31/006* (2013.01); *E02D 2300/0004* (2013.01); *E02D 2300/0046* (2013.01); *E02D 2300/0079* (2013.01)

(58) Field of Classification Search
CPC ..................................................... B09B 1/004
See application file for complete search history.

(56) References Cited

U.S. PATENT DOCUMENTS 2,691,248 A      10/1954  Ford et al.
4,696,599 A  *   9/1987   Rakoczynski ........ E02D 31/004
                                                    210/170.01
(Continued)

FOREIGN PATENT DOCUMENTS

EP   2363535 A1   9/2011
GB   2294856 A    5/1996

OTHER PUBLICATIONS http://endeavourcentre.org/2012/08/a-remarkable-new-insulation/ (Year: 2012).*

(Continued)

*Primary Examiner* — Janine M Kreck
(74) *Attorney, Agent, or Firm* — Condo Roccia Koptiw LLP

(57) ABSTRACT

Systems and methods are disclosed for landfill systems, comprising waste, a geosynthetic product, and a layer of foam glass aggregates interposed between the waste and the geosynthetic product.

25 Claims, 4 Drawing Sheets

(51) Int. Cl.
*C03C 1/00* (2006.01)
*E02D 31/00* (2006.01)

(56) References Cited

U.S. PATENT DOCUMENTS

| | | | | |
|---|---|---|---|---|
| 5,090,843 | A | * | 2/1992 | Grigsby ................. E02D 31/00 405/129.9 |
| 5,447,389 | A | * | 9/1995 | Olson ................... E02D 27/35 405/129.7 |
| 5,516,351 | A | | 5/1996 | Solomon et al. |
| 5,857,807 | A | * | 1/1999 | Longo, Sr. .............. B09B 1/00 405/129.7 |
| 2005/0126441 | A1 | * | 6/2005 | Skelhorn ............... C09D 5/004 106/409 |
| 2006/0002764 | A1 | * | 1/2006 | Legge .................. E02D 31/004 405/129.57 |
| 2006/0029473 | A1 | | 2/2006 | Khire et al. |
| 2009/0269140 | A1 | * | 10/2009 | Hater .................... B09B 1/006 405/129.7 |
| 2013/0272795 | A1 | * | 10/2013 | Hull ...................... B09B 1/004 405/129.45 |
| 2015/0136354 | A1 | * | 5/2015 | Yesiller ................. B09B 1/006 165/45 |
| 2016/0264446 | A1 | | 9/2016 | Foamyna et al. |

OTHER PUBLICATIONS

Perlite Products for Every Application, preme Perlite in Portland, OR https://www.supremeperlite.com/products/ (Year: 2020).*
Physical Characteristics of Perlite, www.perlite.org (Year: 2020).*
Ozel, et al. "Utilization of Natural Zeolite and Perlite as Landfill Liners for in Situ Leachate Treatment in Landfills" Int. J. Environ. Res. Public Health 2012, 9, 1581-1592; doi:10.3390/ijerph9051581 (Year: 2012).*

* cited by examiner

METHODS AND SYSTEMS FOR LANDFILL THERMAL INSULATION

CROSS-REFERENCE TO RELATED APPLICATIONS

This application is the National Stage Entry under 35 U.S.C. § 371 of Patent Cooperation Treaty Application No. PCT/US2018/054969, filed Oct. 9, 2018, which claims the benefit of U.S. Provisional Application Ser. No. 62/569,739, filed Oct. 9, 2017, the entire contents of which are incorporated by reference herein.

BACKGROUND

Waste landfill applications typically incorporate geosynthetic products (e.g., barrier layers, gas collection layers, etc.). However, heat produced by the biodegradation of the waste can have deleterious effects on these geosynthetic products.

Thus, what is needed are improved insulation systems and methods for geosynthetic products in landfill applications.

SUMMARY

Systems and methods are disclosed for landfill systems, comprising waste, a geosynthetic product, and a layer of foam glass aggregates interposed between the waste and the geosynthetic product.

DETAILED DESCRIPTION

Figure 1:
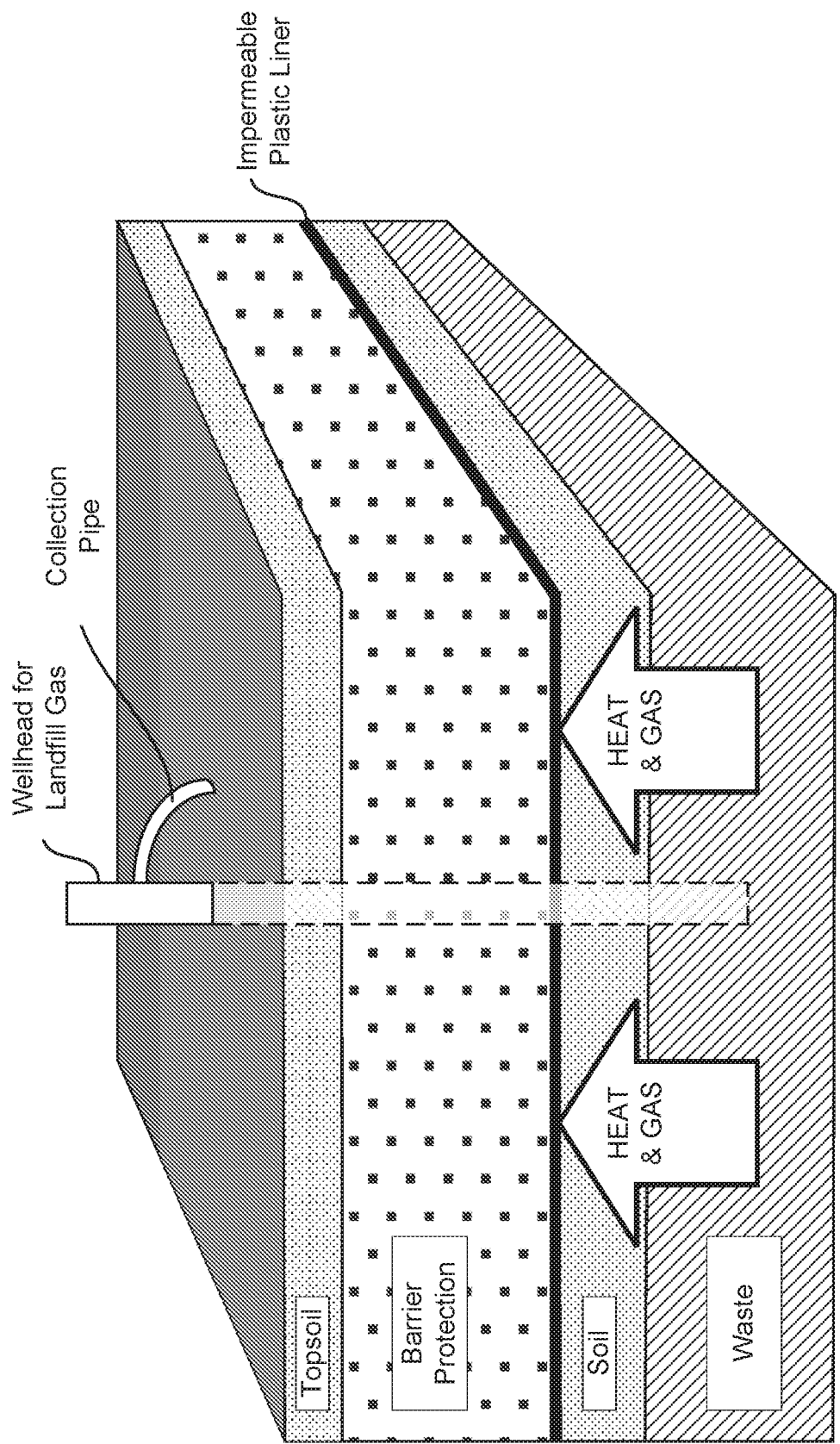
FIG. 1 depicts a landfill cap.

FIG. 1 depicts a landfill cap. Waste is covered by a soil barrier or cover layer.

A geosynthetic product, such as an impermeable plastic liner (e.g., reinforced polyethylene (e.g., high-density polyethylene (HDPE), linear low-density polyethylene (LLDPE) or other cover (e.g., reinforced polypropylene, thermoplastic olefin, ethylene propylene diene monomer, polyvinyl chloride, isobutylene isoprene, butyl rubber, etc.). The impermeable plastic liner acts to trap gas evolved from the biodegradation of the waste.

A wellhead collects the landfill gas, which is transported from a collection pipe to a series of lateral pipes (not depicted).

A layer of barrier protection material covers the impermeable plastic liner, for example, to prevent frost damage or mechanical puncture. Topsoil covers the barrier protection layer.

Both gas and heat are evolved from the biodegradation of the waste. In some instances, the heat can have deleterious effects on the geosynthetic products, including degradation and/or failure. This is disadvantageous for many reasons, and may require the entire system to be replaced. Remediation costs may exceed original installation costs.

Figure 2:
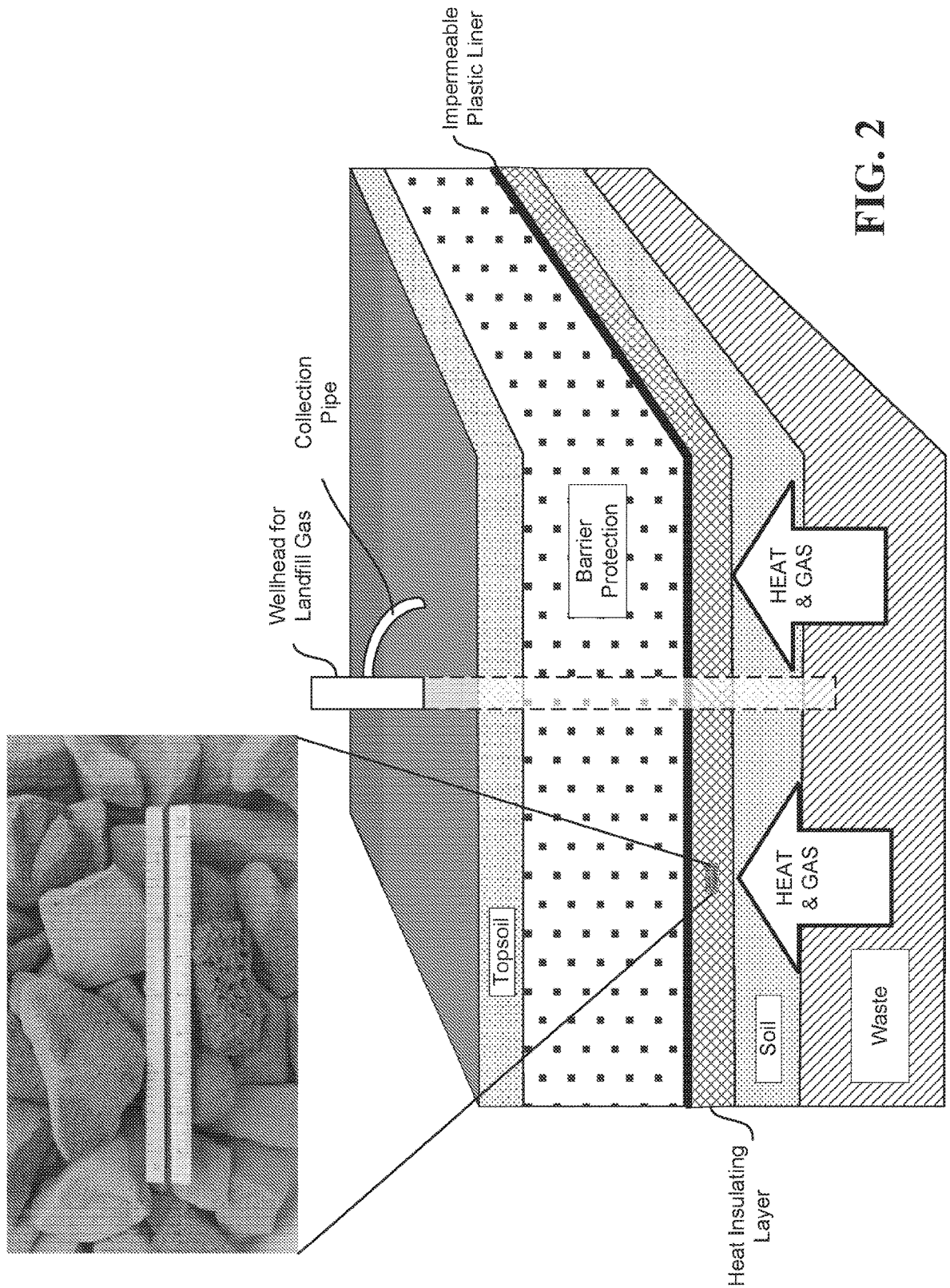
FIG. 2 depicts a landfill cap comprising a layer of foam glass aggregates, such as lightweight-foamed glass aggregate (FG-LWA).

FIG. 2 depicts a landfill cap having features as described with respect to FIG. 1, but further comprising a layer of foam glass aggregates, such as lightweight-foamed glass aggregate (FG-LWA). A layer of FG-LAVA may be interposed between the soil barrier and the impermeable plastic liner.

FG-LWA is an inert, stable, and environmentally friendly-substrate. Typically, to form FG-LWA, recycled glass is cleaned, ground, mixed with a foaming agent, heated, and allowed to fragment from temperature shock. The resulting aggregate is cellular, with a relatively low bulk density, but relatively high durability. FG-LWA has many uses, for example, as a lightweight fill for construction applications, vehicle arrestor beds, building insulation, etc. However, since FG-LWA provides an important economic driver for glass recycling, finding new uses and applications for FG-LWA is extremely desirable. FG-LWA is chemically inert. Moreover, FG-LWA is extremely stable, it does not degrade, and is temperature stable to 800° C. A layer of FG-LWA may provide significant heat insulation for the impermeable plastic liner.

The layer of FG-LWA may be from about six inches to about three feet thick. The layer of FG-LWA may be from about twelve inches to about twenty-four inches thick.

Suitable FG-LWA may be procured from AERO AGGREGATES, LLC, Eddystone, Pa. The FG-LWA may be prepared from a recycled glass cullet. The FG-LWA may be prepared from a sodo-calic glass. As FG-LWA is made up of silica, it may be considered a natural material for regulatory purposes. As FG-LWA is made from recycled glass, it may be considered environmentally friendly. FG-LWA properties include low unit weight, low thermal conductivity, high strength, non-absorbent, non-toxic, non-leachable, chemically stable, impervious to UV degradation, freeze/thaw stable, and fireproof.

The FG-LWA may be prepared from recycled glass cullet that contains less than 1% borosilicate glass.

The FG-LWA may have a particle size of about 5 min to about 80 mm. The FG-LWA may have a particle size of about 10 mm to about 60 mm. The FG-LWA may have a bulk density of about 120 kg/m$^3$ to about 400 kg/m$^3$. The FG-LWA may have a bulk density of about 200 kg/m$^3$ to about 240 kg/m$^3$.

Figure 3:
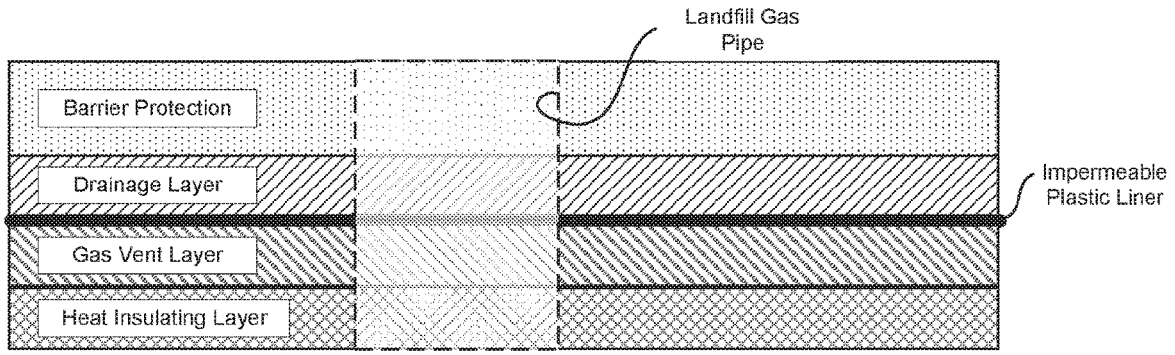
FIG. 3 depicts a schematic of selected layers of a landfill cap incorporating FG-LWA.

Turning to FIG. 3, the impermeable plastic liner may have a series of adjacent layers. A drainage layer may be interposed between the barrier protection layer and the impermeable plastic liner to provide drainage. A gas vent layer may be disposed under the impermeable plastic liner to facilitate gas collection. The heat insulating layer (e.g., of FG-LWA) may be used to protect the impermeable plastic liner and gas vent layer (and its associated piping and components) from excessive heat from the waste.

Figure 4:
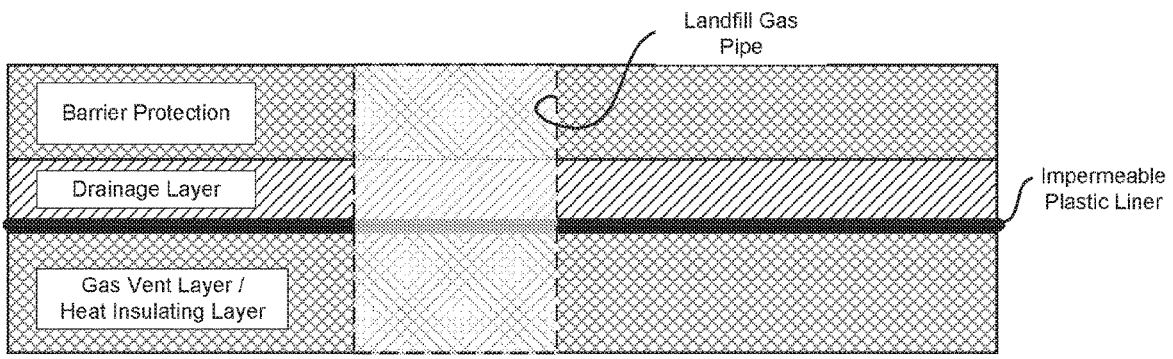
FIG. 4 depicts a schematic of selected layers of a landfill cap incorporating FG-LWA.

Turning to FIG. 4, the impermeable plastic liner may have a series of adjacent layers. A drainage layer may be interposed between the barrier protection layer and the impermeable plastic liner to provide drainage. A layer of FG-LWA may be disposed under (e.g., directly under) the impermeable plastic liner. The layer of FG-LWA may act as both a gas vent layer to facilitate gas collection and a heat insulating layer to protect the impermeable plastic liner and associated piping and components from excessive heat from the waste. FG-LWA may exhibit a high flow rate for gas collection.

Figure 5:
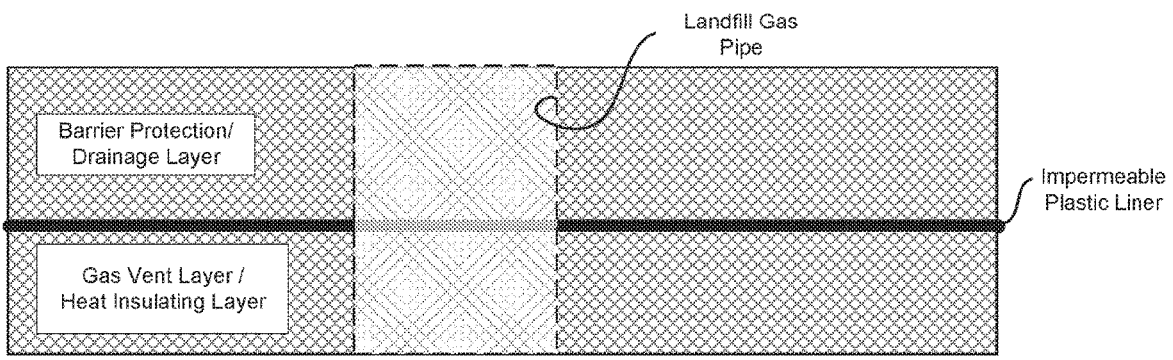
FIG. 5 depicts a schematic of selected layers of a landfill cap incorporating FG-LWA.

Turning to FIG. 5, the impermeable plastic liner may have a series of adjacent layers. A first layer of FG-LWA may be placed above the impermeable plastic liner to provide drainage. FG-LWA is permeable to water, and does not compact, allowing water to pass through the layer of FG-LWA. A layer of FG-LWA may be used as a barrier protection layer in a landfill cap. FG-LWA exhibits exceptional long-term durability. FG-LWA is inert and does not degrade. Moreover, FG-LWA has a low unit weight, thereby reducing settlement within the waste.

Additionally, FG-LWA provides frost protection. Accordingly, a barrier protection layer containing FG-LWA has the advantage of reducing the amount of topsoil required (e.g., as a cover layer) in colder regions (e.g., those with relatively deeper frost depth levels).

A second layer of FG-LWA may be disposed under (e.g., directly under) the impermeable plastic liner. The second layer of FG-LWA may act as both a gas vent layer to facilitate gas collection and a heat insulating layer to protect the impermeable plastic liner and associated piping and components from excessive heat from the waste.

Figure 6:
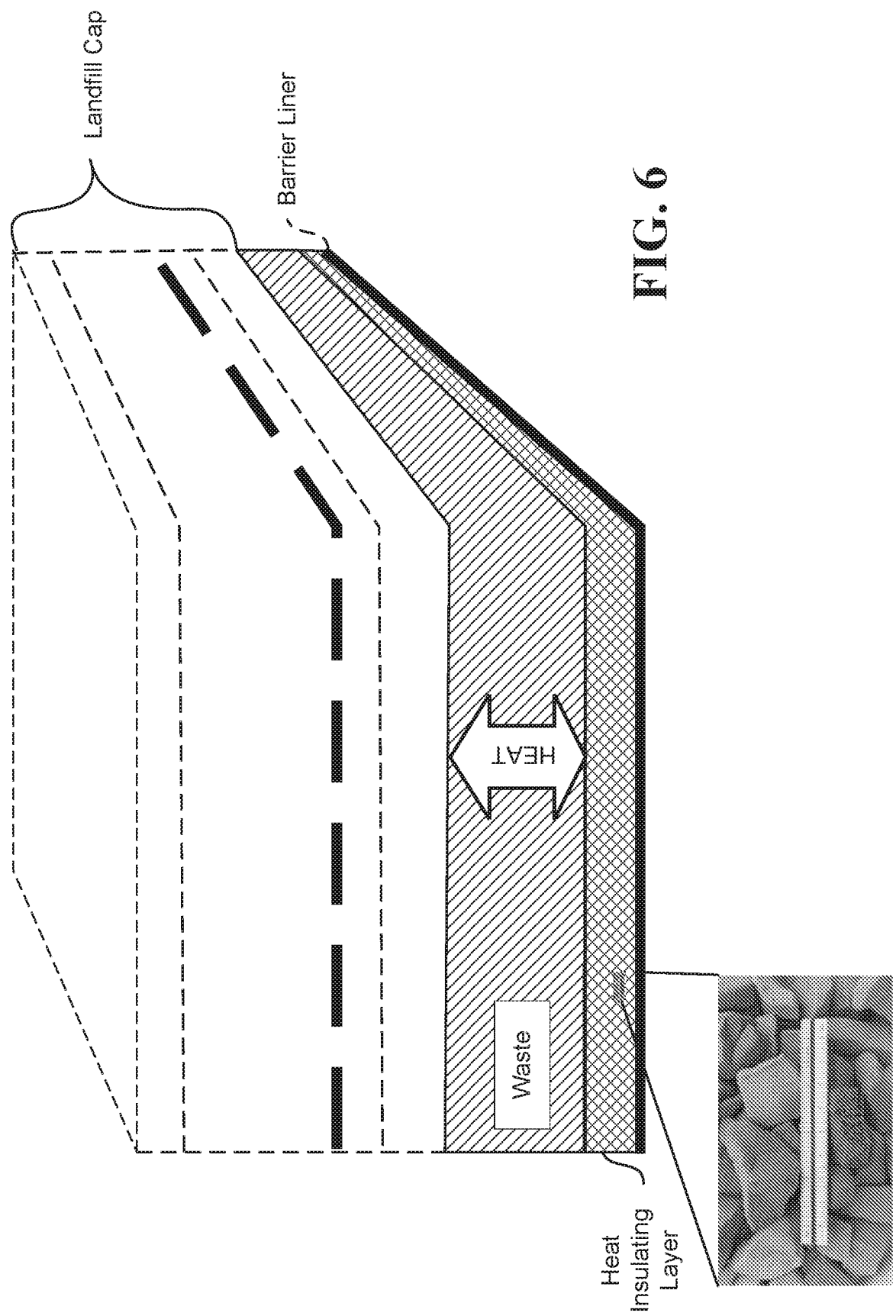
FIG. 6 depicts a landfill barrier liner thermally insulated from waste by a layer of FG-LWA.

Turning to FIG. 6, a landfill may have a barrier liner (for example, to prevent leachate from reaching groundwater, for compliance with government regulation, etc.). A layer of FG-LWA may be placed above the barrier liner, interposed between the waste and the barrier liner. The FG-LWA may be used in conjunction with leachate lines (e.g., a leachate collection system), providing a lightweight, draining, fill. The FG-LWA may provide thermal insulation for the barrier liner from the waste. The layer of FG-LWA may be from about six inches to about twenty-four inches thick. The layer of FG-LWA may be about twelve inches thick.

A landfill cap (depicted in dashed lines) may be placed above the waste. The landfill cap, in one example, may be one described herein. Waste may be thermally insulated by two layers of FG-LWA, e.g., a layer of FG-LWA above the waste (e.g., thermally insulating the gas collection liner), and a layer of FG-LWA below the waste (e.g., thermally insulating the barrier liner).

FG-LWA may also be combined with water treatment media (such as, for example steel slag, calcium carbonates, etc.) that removes phosphates and nitrates.

EXAMPLES

Example 1

Recycled glass cullet is cleaned, ground to less than 150 micrometers (US Standard sieve size No. 100), mixed with a foaming agent (e.g., a carbonate foaming agent) in a pug mill, heated, and allowed to fragment from temperature shock. The resulting FG-LWA is cellular. After sample preparation, the initial moisture content is measured following ASTM D2216 (2010), grain size distributions are determined following ASTM C136/136M (2006) and the initial bulk density is measured following ASTM 0127 (2012a) on the FG-LWA. The average moisture content is determined to be 1.06% and the average bulk density is determined to be 227.2 kg/m3 (14.2 pcf). Sieve analyses are performed following the thy sieving method on the FG-LWA. Particle size ranges from 10 to 30 mm (0.39 to 1.18 in) but is a very uniformly graded material.

Example 2

Recycled glass cullet is cleaned, ground, mixed with a foaming agent, heated, and allowed to fragment from temperature shock. The resulting FG-LWA is cellular (foaming creates a thin wall of glass around each gas bubble). By volume, FG-LWA is approximately 92% gas bubbles and 8% glass. The water content (per ASTM D 2216) of FG-LWA is about 7%.

The invention claimed is:

1. A method, comprising,
placing, in a landfill, an impermeable plastic liner, a layer of waste, and, interposed between the waste layer and the impermeable plastic liner, a layer of foam glass aggregates, and
placing, in the landfill, a second layer of foam glass aggregates,
wherein the foam glass aggregates are chemically inert and temperature stable.

2. The method of claim 1, wherein the at least one of the layer of foam glass aggregates and the second layer of foam glass aggregates is about six inches to about thirty-six inches thick.

3. The method of claim 1, wherein the foam glass aggregates have a particle size of about 5 mm to about 80 mm.

4. The method of claim 1, wherein the foam glass aggregates have a bulk density of about 200 kg/m$^3$ to about 400 kg/m$^3$.

5. The method of claim 1, wherein the foam glass aggregates are prepared from a recycled glass cullet.

6. The method of claim 1, wherein the second layer of foam glass aggregates is a drainage layer placed above the impermeable plastic liner.

7. A landfill system, comprising:
waste;
a geosynthetic product comprising an impermeable plastic liner; and
a layer of foam glass aggregates interposed between the waste and the impermeable plastic liner to protect the impermeable plastic liner from deleterious effects of heat produced by biodegradation of the waste;
wherein the layer of foam glass aggregates comprises a gas vent layer, and the impermeable plastic liner is above both the layer of foam glass aggregates and the waste to trap gas evolved from the biodegradation of the waste.

8. The landfill system of claim 7, wherein the layer of foam glass aggregates is about six inches to about thirty-six inches thick.

9. The landfill system of claim 7, wherein the foam glass aggregates have a particle size of about 5 mm to about 80 mm.

10. The landfill system of claim 7, wherein the foam glass aggregates have a bulk density of about 200 kg/m$^3$ to about 400 kg/m$^3$.

11. The landfill system of claim 7, wherein the foam glass aggregates are prepared from a recycled glass cullet.

12. The landfill system of claim 7, further comprising a second layer of foam glass aggregates to act as a drainage layer, wherein the layer of foam glass aggregates and the second layer of foam glass aggregates are separated by the geosynthetic product.

13. A landfill system, comprising:
waste;
a geosynthetic product comprising an impermeable plastic liner; and
a layer of foam glass aggregates interposed between the waste and the impermeable plastic liner to protect the impermeable plastic liner from deleterious effects of heat produced by biodegradation of the waste;
wherein the layer of foam glass aggregates comprises a leachate layer and the impermeable plastic liner is below both the layer of foam glass aggregates and the waste as a barrier layer to prevent leachate from the waste from reaching groundwater.

14. The landfill system of claim 13, wherein at least one layer of foam glass aggregates is about six inches to about thirty-six inches thick.

15. The landfill system of claim 13, wherein the foam glass aggregates have a particle size of about 5 mm to about 80 mm.

16. The landfill system of claim 13, wherein the foam glass aggregates have a bulk density of about 200 kg/m$^3$ to about 400 kg/m$^3$.

17. The landfill system of claim 13, wherein the foam glass aggregates are prepared from a recycled glass cullet.

18. A landfill system, comprising:
   a first layer of foam glass aggregates;
   a geosynthetic product comprising an impermeable plastic liner disposed below the first layer of foam glass aggregates;
   a second layer of foam glass aggregates disposed below the impermeable plastic liner; and
   waste disposed below the second layer of foam glass aggregates;
   wherein the second layer of foam glass aggregates interposed between the waste and the impermeable plastic liner protects the impermeable plastic liner from deleterious effects of heat produced by biodegradation of the waste.

19. The landfill system of claim 18, further comprising a second geosynthetic product disposed below the waste as a barrier layer to prevent leachate from the waste from reaching groundwater.

20. The landfill system of claim 19, further comprising a third layer of foam glass aggregates interposed between the waste and the second geosynthetic product.

21. The landfill system of claim 18, wherein the first layer of foam glass aggregates acts as one or more of a drainage layer and a barrier protection layer, and wherein the second layer of foam glass aggregates acts as one or more of a heat insulation layer and a gas vent layer.

22. The landfill system of claim 18, wherein at least one layer of foam glass aggregates is about six inches to about thirty-six inches thick.

23. The landfill system of claim 18, wherein the foam glass aggregates have a particle size of about 5 mm to about 80 mm.

24. The landfill system of claim 18, wherein the foam glass aggregates have a bulk density of about 200 kg/m$^3$ to about 400 kg/m3.

25. The landfill system of claim 18, wherein the foam glass aggregates are prepared from a recycled glass cullet.

* * * * *